(12) United States Patent
Hede

(10) Patent No.: US 8,516,666 B2
(45) Date of Patent: Aug. 27, 2013

(54) ATTACHMENT BUCKLE WITH DOUBLE LOCKING

(75) Inventor: Jean-Marc Hede, Domene (FR)

(73) Assignee: Zedel, Crolles (FR)

( * ) Notice: Subject to any disclaimer, the term of this patent is extended or adjusted under 35 U.S.C. 154(b) by 113 days.

(21) Appl. No.: 13/173,686

(22) Filed: Jun. 30, 2011

(65) Prior Publication Data

US 2012/0000041 A1   Jan. 5, 2012

(30) Foreign Application Priority Data

Jul. 2, 2010 (FR) .................................... 10 02797

(51) Int. Cl.
*A44B 13/02* (2006.01)

(52) U.S. Cl.
USPC ..................................................... 24/599.8

(58) Field of Classification Search
USPC .................. 24/599.1, 599.4–599.8, 643, 644, 24/647–650
See application file for complete search history.

(56) References Cited

U.S. PATENT DOCUMENTS

| 499,304 | A | * | 6/1893 | Minshall | ...................... 24/599.6 |
| 4,791,711 | A | * | 12/1988 | Adams | ............................ 24/633 |
| 8,225,970 | B2 | * | 7/2012 | Ventrola | ....................... 224/158 |
| 2004/0078943 | A1 | | 4/2004 | Hede et al. | |

FOREIGN PATENT DOCUMENTS

| CN | 201263446 Y | 7/2009 |
| DE | 249673 C | 7/1912 |
| DE | 10 2006 004 852 A1 | 8/2007 |
| EP | 1 465 507 B1 | 11/2006 |
| WO | WO 03/059107 A1 | 7/2003 |

* cited by examiner

*Primary Examiner* — James Brittain
(74) *Attorney, Agent, or Firm* — Oliff & Berridge, PLC

(57) ABSTRACT

A fixing buckle comprising a base provided with a latching hook for attaching a retaining ring, and a locking mechanism able to occupy a locking position and a releasing position to respectively secure and release the retaining ring on and from the latching hook. The locking mechanism comprises two locking elements independent from one another and each having a stop and a control button. The locking elements are formed by two levers pivotally mounted inside the cover, the stop being arranged at one of the ends of each lever and the control button at the other end thereof. Detachment of the ring is enabled on no load and when the buttons of the two levers are actuated simultaneously to the releasing position.

4 Claims, 4 Drawing Sheets

ATTACHMENT BUCKLE WITH DOUBLE LOCKING

BACKGROUND OF THE INVENTION

The invention relates to an attachment buckle comprising a base provided with a hook for attaching a retaining ring, and control means able to occupy a locking position and a releasing position to respectively secure and release the retaining ring on and from the latching hook, the control means comprising two locking elements independent from one another and both having a stop and a control button.

The fixing buckle is connected to a strap of a belt or to a harness for climbing, caving or for working at a height. For safety reasons, any untimely opening of the buckle has to be impossible.

STATE OF THE ART

The document EP 1465507 describes a fixing buckle with self-locking comprising a single control button movable between a closed position and an open position, and a swivelling latch to lock the control button in the closed position. The latch is arranged in the central part of the buckle, and the button is provided with a tab forming a stop which retracts when the ring is inserted on the latching hook. Opening of the buckle under tension is impossible.

Opening command of the buckle has to be performed without any load and requires two distinct consecutive actions:

- a first action of unlocking the latch and of pressing on the button to open the buckle;
- a second action to unhook the ring from the latching hook, by pushing it backwards, while at the same time removing the finger which was pressing on the button and which is on the path of the ring.

The actuating movements necessary for opening require a certain time, as it is necessary to first unlock the latch, to press on the button, and then to remove the ring while at the same time taking one's finger off.

The document DE 249673 relates to a fixing buckle with two locking elements arranged in alignment in the transverse direction, the buttons of which elements are salient on each side of the buckle. Such an arrangement of the buttons does not enable reliable securing of the buckle to be guaranteed.

OBJECT OF THE INVENTION

The object of the invention consists in providing a buckle for fixing a ring that is of reliable structure, that is easy to release using both hands when the buckle is not on load, and preventing any involuntary releasing in normal use with no hands.

The fixing buckle according to the invention is characterized in that the locking elements are formed by two levers pivotally mounted inside the cover, the stop being arranged at one of the ends of each lever and the control button being arranged at the other end thereof, detachment of the ring being enabled when on no load and when the buttons of the two levers are actuated simultaneously to the releasing position.

The retaining ring remains captive in the latching hook and any untimely opening of the fixing buckle is impossible without action on the lateral buttons. Double locking of the retaining ring in the fixing buckle is thereby obtained. Deliberate or involuntary actuation of a single button is not sufficient to remove the ring from the latching hook.

According to a preferred embodiment, the two locking elements are arranged symmetrically with respect to the longitudinal mid-plane. The locking elements are housed inside a cover fixed to the base and comprising two lateral apertures for access to the control buttons. The lever of each locking element is pivotally mounted around an inclined axis enabling offset pivoting, the two levers being arranged symmetrically with respect to the longitudinal mid-plane.

According to one feature of the invention, a bias spring is associated with each pivoting lever to bias the latter to the raised locking position.

The lever of each locking element can be provided with a ramp on which the retaining ring presses when the latter is inserted in the latching hook.

BRIEF DESCRIPTION OF THE DRAWINGS

Other advantages and features will become more clearly apparent from the following description of an embodiment of the invention given for non-restrictive example purposes only and represented in the appended drawings, in which.

DETAILED DESCRIPTION OF THE INVENTION

Figure 1:
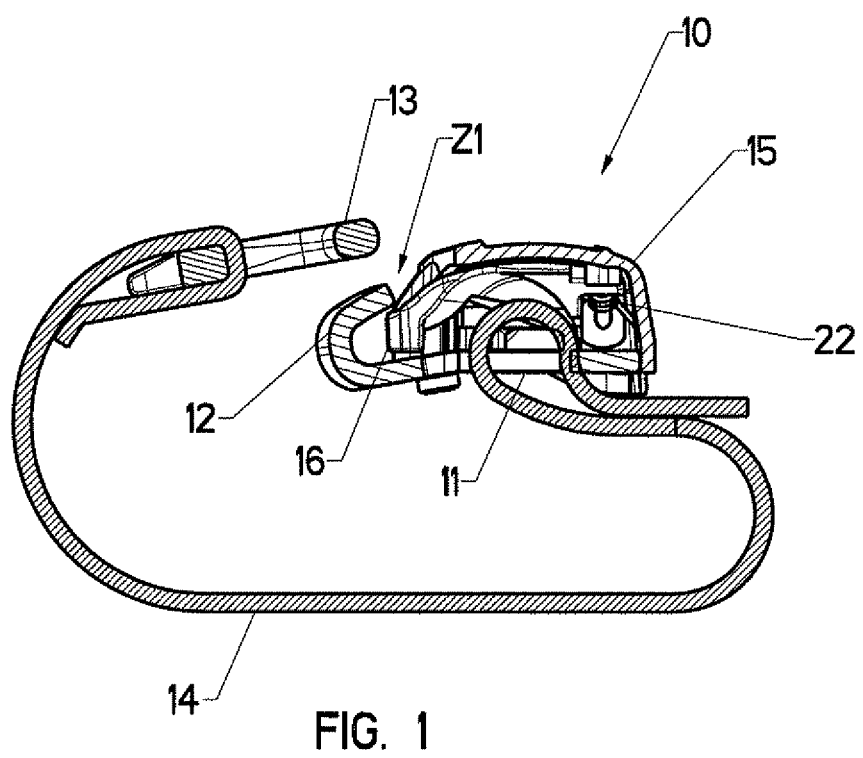
FIG. 1 is a schematic view of the buckle with the latching ring in the unhooked state.
Figure 4:
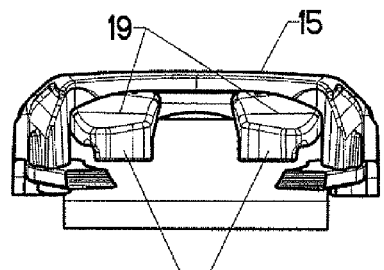
FIGS. 3 and 4 are cross-sectional views along the lines 3-3 and 4-4 of FIG. 2.
Figure 2:
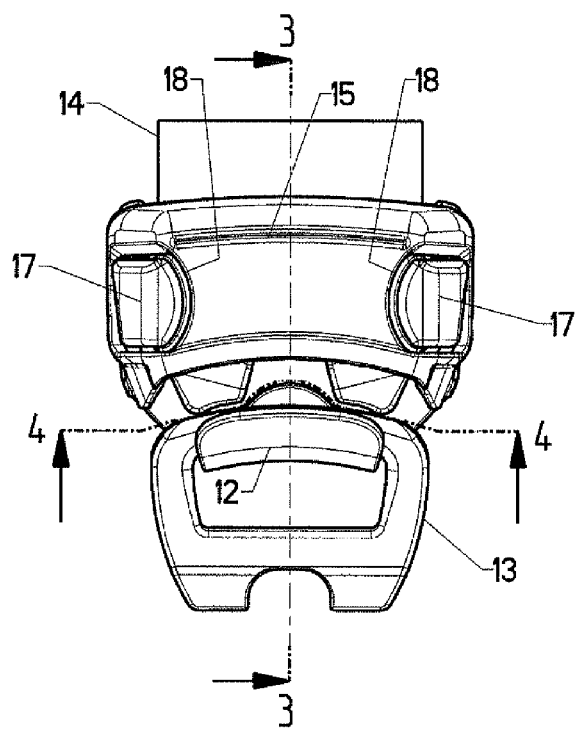
FIG. 2 shows a plan view of the buckle with the locking elements in the raised locking position keeping the ring captive in the latching hook.
Figure 3:
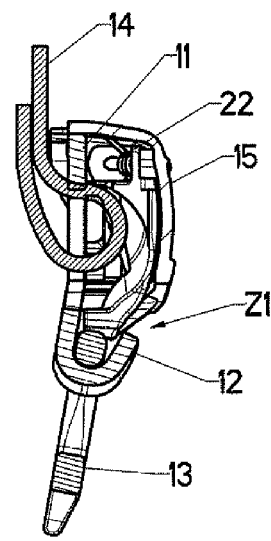
Figure 6:
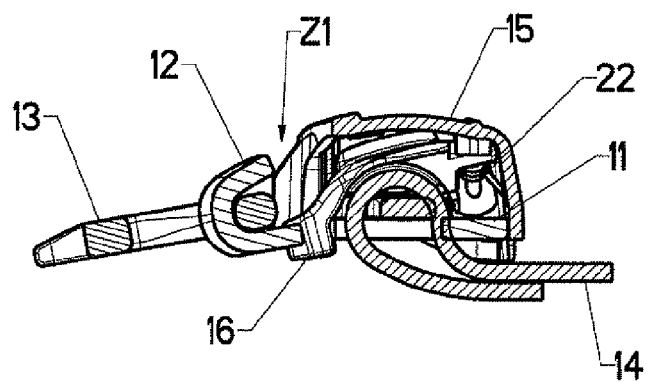
FIGS. 6 and 7 are cross-sectional views along the lines 6-6 and 7-7 of FIG. 5.
Figure 5:
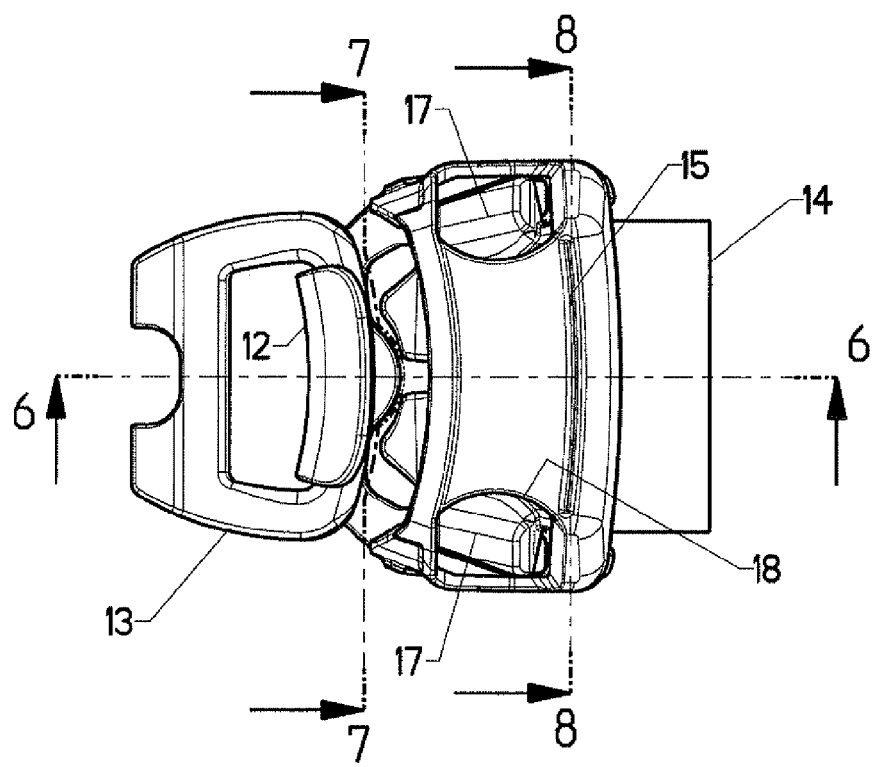
FIG. 5 represents an identical view to FIG. 2, with the locking elements in the depressed releasing position enabling the ring to be unhooked.
Figure 7:
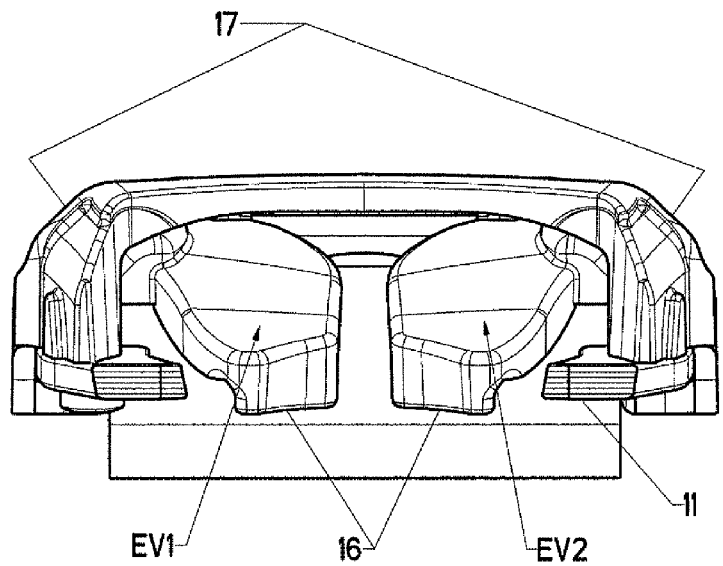
Figure 8:
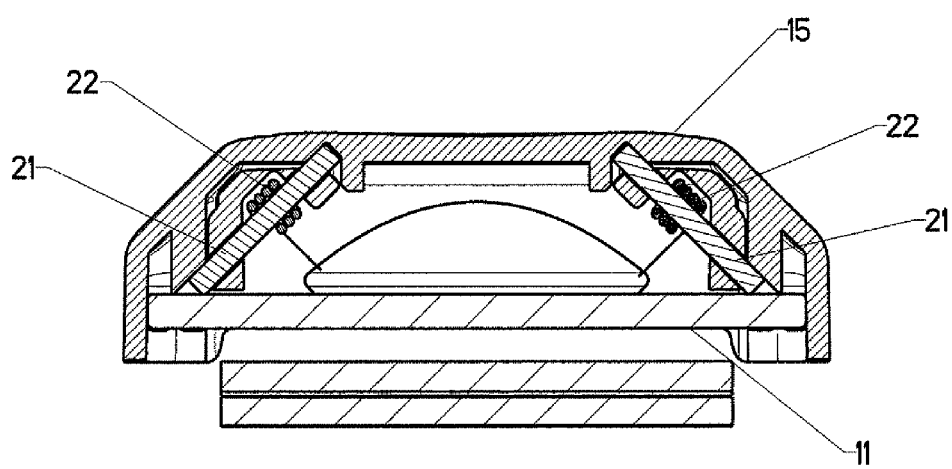
FIG. 8 is a cross-sectional view along the line 8-8 of FIG. 5 showing the articulations of the two levers.

In the figures, a fixing buckle 10 comprises a metal base 11 provided with a latching hook 12 at the front part thereof. Hook 12 is designed to receive a retaining ring 13 to which an attachment strap 14, for example of a belt or a harness, is connected. The rear part of base 11 is in the form of a clamp provided with means for adjusting the length of the attachment strap 14.

Base 11 is fixed to a cover 15 which partially covers the top surface of base 11 except for the insertion zone Z1 of retaining ring 13 in latching hook 12.

Cover 15 is equipped with control means able to occupy a locking position and a releasing position to respectively secure and release retaining ring 13 in and from introduction zone Z1. These control means comprise two locking elements EV1, EV2 independent from one another and positioned symmetrically on each side of the longitudinal mid-plane of buckle 10.

In the described example, the two locking elements EV1, EV2 are formed by two levers 20 pivotally mounted around inclined axes 21. Each lever 20 has a stop 16 at one end thereof and a control button 17 at the other end thereof. The two stops 16 are located facing latching hook 12 and move in introduction zone Z1 if the two buttons 17 are actuated. The two buttons 17 are accessible being housed in two apertures 18 provided laterally in cover 15. The two buttons 17 simply have to be pressed to the depressed releasing position to make the two stops 16 retract.

A bias spring 22 is fitted on each pivoting axis 21 of the two locking elements EV1, EV2 to bias the latter to the raised locking position.

A ramp 19 on which retaining ring 13 presses when the latter is inserted in latching hook 12 is arranged above stop 16 of each locking element EV1, EV2.

Operation of the fixing buckle 10 according to the invention is as follows:

To hook retaining ring 13 on latching hook 12 of buckle 10, the ring simply has to be pressed on ramps 19 of the two locking elements EV1, EV2 exerting a certain pressure. This results in manual releasing driving stops 16 to the depressed releasing position. Retaining ring 13 can enter introduction zone Z1 hooking onto latching hook 12, and stops 16 automatically return to the raised locking position. Retaining ring 13 remains captive in latching hook 12, and any untimely opening of fixing buckle 10 is impossible without any action on the lateral buttons 17.

Double locking of retaining ring 13 in fixing buckle 10 is thereby achieved. Deliberate or involuntary actuation of a single button 17 is not sufficient to remove ring 13 from latching hook 12.

When fixing buckle 10 is under load due to the tension of the strap, any releasing of retaining ring 13 is also disabled, even by actuating the two buttons 17 in the releasing direction.

Opening command of fixing buckle 10 can only be performed if:
- the two lateral buttons 17 are actuated simultaneously to the depressed unlocking position,
- buckle 10 is not under load, which enables the ring to be pushed to the rear resulting in an escaping movement of ring 13 from latching hook 12. In loaded state, this manual pushing movement is rendered impossible on account of the high opposing force exerted by the tension of the strap on ring 13.

For the releasing command, the two lateral buttons 17 simply have to be moved towards one another by means of the thumb and index finger of a single hand. Pivoting of levers 20 takes place in offset manner resulting in a downward vertical component, i.e. in the releasing direction.

It is clear that pivoting levers 20 of the two locking elements EV1, EV2 can be replaced by equivalent means, in particular tabs movable by translation, or push-buttons arranged side by side.

The invention claimed is:

1. A fixing buckle comprising:
    a base provided with a latching hook for attaching a retaining ring,
    control means able to occupy a locking position and a releasing position to respectively secure and release the retaining ring on and from the latching hook, said control means comprising two locking elements independent from one another and both having a stop and a control button,
    wherein the locking elements are formed by two levers inside a cover, the lever of each locking element being pivotally mounted around an inclined axis enabling offset pivoting, the two levers being arranged symmetrically with respect to the longitudinal mid-plane,
    wherein said stop is arranged at one of the ends of each lever and said control button is arranged at the other end thereof,
    detachment of the ring being enabled on no load and when the buttons of the two levers are actuated simultaneously to the releasing position.

2. The fixing buckle according to claim 1, wherein the levers of the locking elements are housed inside the cover fixed to the base, and comprising two lateral apertures for access to the control buttons.

3. The fixing buckle according to claim 1, wherein a bias spring is associated with each pivoting lever to bias the latter to the raised locking position.

4. The fixing buckle according to claim 1, wherein the lever of each locking element is provided with a ramp on which the retaining ring presses when the latter is inserted in the latching hook.

* * * * *